United States Patent [19]
Emer et al.

[11] Patent Number: 5,837,964
[45] Date of Patent: Nov. 17, 1998

[54] LASER DRILLING HOLES IN COMPONENTS BY COMBINED PERCUSSION AND TREPAN DRILLING

[75] Inventors: George Emer, Cresskill, N.J.; Dwight Edlund, Stony Point, N.Y.; Steve Vanasse, Carmel, N.Y.; Michael L. Dizzine, Nyack, N.Y.

[73] Assignee: Chromalloy Gas Turbine Corporation, Orangeburg, N.Y.

[21] Appl. No.: 8,092

[22] Filed: Jan. 16, 1998

[51] Int. Cl.⁶ .......................... B23K 26/00; B23K 26/08
[52] U.S. Cl. .................................................. 219/121.71
[58] Field of Search ........................... 219/121.6, 121.67, 219/121.7, 121.71, 121.72, 121.84, 121.78, 121.8

[56] References Cited

U.S. PATENT DOCUMENTS

| | | | |
|---|---|---|---|
| 4,169,976 | 10/1979 | Cirri | 219/121.72 |
| 4,737,613 | 4/1988 | Frye | 219/121.72 |
| 4,873,414 | 10/1989 | Ma et al. | 219/121.7 |
| 4,992,025 | 2/1991 | Stroud et al. | 416/97 R |
| 5,043,553 | 8/1991 | Corfe et al. | 219/121.7 |
| 5,049,722 | 9/1991 | Corfe et al. | 219/121.71 |
| 5,093,548 | 3/1992 | Schmidt-Hebbel | 219/121.71 |
| 5,140,127 | 8/1992 | Stroud et al. | 219/121.71 |
| 5,166,493 | 11/1992 | Inagawa et al. | 219/121.71 |
| 5,222,617 | 6/1993 | Gregory et al. | 219/121.71 |
| 5,223,692 | 6/1993 | Lozier et al. | 219/121.67 |
| 5,227,098 | 7/1993 | Philby et al. | 264/400 |
| 5,516,998 | 5/1996 | Chatelain et al. | 219/121.7 |
| 5,593,606 | 1/1997 | Owen et al. | 219/121.71 |
| 5,609,779 | 3/1997 | Crow et al. | 219/121.71 |
| 5,688,418 | 11/1997 | Yoshiyasu et al. | 219/121.71 |

FOREIGN PATENT DOCUMENTS

| | | | |
|---|---|---|---|
| 61-82986 | 4/1986 | Japan | 219/121.72 |
| 2-108484 | 4/1990 | Japan | 219/121.71 |
| 4-33788 | 2/1992 | Japan | 219/121.71 |

OTHER PUBLICATIONS

Anon., "Trepanning moves in on mini holes," Machinery and Production Engineering, pp. 42–43, Nov. 1983.

Rohde et al., "Trepan drilling of fuel injection nozzles with a TEM00 Nd:YAG slab laser," Journal of Laser Applications, vol. 8, No. 2, pp. 95–101, Apr. 1996.

Bostanjoglo et al., "Processing of Ni–based aero engine components with repetively Q–switched Nd:YAG–lasers," Proceedings of SPIE, vol. 2789, pp. 145–157, Jun. 1996.

VanderWert et al., "Laser drilling effusion cooling holes in low $NO_x$ turbine engine components," Proceedings of the 1996 ASME Turbo Asia Conference, pp. 1–8 Nov. 1996.

Terry Vander Wert, "Lasers Take On Hole–Making Challenges", Jun. 1994, Modern Machine Shop, 62–69.

*Primary Examiner*—Gregory L. Mills
*Attorney, Agent, or Firm*—Mitchell D. Bittman

[57] ABSTRACT

A process is provided for laser drilling relatively large and deep holes in superalloy components by percussion laser drilling a central hole through the component to a diameter less than the predetermined diameter, then trepanning laser drilling around the central hole to expand the diameter of the hole to the predetermined diameter. The steps are repeated to deepen the hole.

11 Claims, No Drawings

LASER DRILLING HOLES IN COMPONENTS BY COMBINED PERCUSSION AND TREPAN DRILLING

This invention relates to the laser drilling of holes in components, more particularly it relates to laser drilling relatively large and deep holes in superalloy components and in particular gas turbine components, such as turbine blades and vanes.

Laser drilling of holes, such as cooling holes, into gas turbine components such as turbine blades and vanes has been known for some time. Laser materials processing involves focusing a high power laser beam onto the surface of a work piece. A portion of the beam is absorbed, the amount depending upon the material type and surface condition. The high intensity (on the order of $10^7$ watts per $cm^2$) produced by absorption of high power (eg. 250 watts) and focusing the beam to 0.004 to 0.008 inch diameter results in heating, melting, and vaporization of the surface material.

Laser drilling is most noted for ability to produce small (e.g. 0.004 inch) diameter holes, holes with high (>10:1) aspect (depth to diameter) ratios, and holes at shallow (10°) angles from the surface, all in the toughest aerospace alloys.

There are two types of laser drilling processes: percussion drilling and trepanning. Percussion laser drilling is typically used for production drilling of cooling holes in blades and nozzle guide vanes. The process involves a stationary beam and one or more pulses to penetrate the thickness of the material. With percussion drilling, the hole diameter is established by the beam diameter and power level.

Trepanning laser drilling involves contour cutting the hole. It involves moving the beam along a circular path to produce a hole having a diameter greater than that produced by a stationary focused beam (i.e. as in percussion drilling). A high pressure inert or oxidizing gas flows though a nozzle coincident with the laser beam providing mechanical energy needed to remove the laser melted metal. With trepanning, the hole diameter is limited only by the motion system travel.

The percussion drilling and trepanning processes are limited when it comes to drilling relatively large (e.g. of at least 0.030 inches) and deep (e.g. of at least 0.30 inches) holes, especially with regard to drilling holes through Ni and/or Co based superalloys. The percussion method is limited in that the maximum aspect ratios that can be effectively drilled due to slag buildup blocking the hole is about 10:1 with hole diameters of about 0.030 inches. Further, when large and deep holes are percussion drilled the holes formed are observed to be tapered, i.e. smaller at the bottom. Trepanning of large and deep holes is also ineffective in that before the hole becomes too deep slag tends to accumulate in the hole and the laser energy becomes absorbed by the substrate interfering with further drilling.

Thus it is an object of the present invention to provide a process for laser drilling large and deep holes through superalloy components.

SUMMARY OF THE INVENTION

Briefly, a process is provided for laser drilling a hole through a nickel and/or cobalt based superalloy component, said hole having a predetermined diameter of at least about 0.030 inches and a depth to diameter ratio of at least about 10:1, comprising percussion laser drilling a central hole through the superalloy to a diameter less that the predetermined diameter, then trepanning laser drilling a hole around the central hole to expand the diameter of the hole to the predetermined diameter. These steps are repeated as needed during the hole drilling process to complete the formation of a uniform hole.

DETAILED DESCRIPTION

Laser drilling is generally carried out with a pulsed YAG laser using a CNC (computer numerical control). The laser typically produces a beam of approximately 0.004 to 0.008 inches diameter with an average energy of about 250 watts. An optical system is provided which includes a lens for focusing the laser beam onto the surface of the component to be drilled. The component is a Ni and/or Co based superalloy. Typical superalloys include Mar-M509, IN-738, CMSX-4, IN-792, U520 and X-40. The components can be gas turbine components, e.g. turbine blades and vanes, and the holes are generally drilled for film cooling purposes. The predetermined diameter being drilled is at least about 0.030 inches with a depth to diameter ratio of at least about 10:1, preferably about 0.03 to 0.10 inches diameter with a depth to diameter ratio of about 20 to 30:1. Generally the depth of the hole is within the range of about 0.4 to 1.5 inches.

The first step of the process involves percussion drilling a central hole through the superalloy to a diameter less than the desired (predetermined) diameter. The central hole formed by percussion drilling has a diameter up to about 0.020 inches, preferably 0.01 to 0.02 inches. An eight inch focal length lens can be used in percussion drilling the central hole. Typically during percussion laser drilling 4 to 8 laser pulses/second are used. This central hole diameter facilitates the removal of slag and allows the subsequent trepanning to be effectively carried out.

After the percussion drilling trepanning laser drilling is carried out to expand the central hole to the predetermined diameter. Trepanning involves laser drilling a series of small circles with the laser following a circular path to produce a hole with the predetermined diameter. A six inch focal length lens can be used during trepanning to produce the trepanning circles. During trepanning typically 10 to 15 laser pulses/second are used. The relative motion of the laser beam to the component can be carried out by moving the laser beam and/or the component by methods as are common in the art. During trepanning if slag is deposited interfering with drilling then the percussion drilling step is repeated followed by the trepanning step. These two operations are repeated until the predetermined hole diameter is achieved uniformly through the full depth of superalloy material.

During the laser drilling process the rear of the hole is kept clear to allow for slag to exit the central hole during trepanning. Thus no barrier material (eg. resin) is used abutting the exit of the hole. However, a protective barrier may be desirable to prevent any erosion of the wall of the component opposite to the exit of the hole. A protective barrier material (eg. resin) may be used on the wall of the component opposing the exit of the hole to protect this surface of the component which is in the path of the laser beam from being machined or damaged.

EXAMPLE

A M34 Convergent Energy CNC pulsed YAG laser machine was used to produce a 0.045 inch diameter hole through a 0.9 inch thick wall of a industrial turbine vane component comprised of a MAR M509 superalloy.

Using an eight inch focal length lens a 0.015 to 0.020 inch diameter central hole was percussion drilled through the component using a laser pulse rate of 6 pulses/second. Using a six inch focal length lens trepanning laser drilling was carried out with a series of circles drilled about each central hole using a laser pulse rate of 12 pulses/second creating a 0.045 inch diameter hole. As slag built up in the hole during trepanning blocking the central hole the percussion drilling was repeated to clear the central hole followed by trepanning. These steps were repeated until the 0.045 inch diameter hole was achieved through the 0.9 inch depth. The hole was of a uniform diameter, with minimal taper.

What is claimed:

1. A process of laser drilling a hole through nickel, cobalt or nickel and cobalt based superalloy component said hole having a predetermined diameter of at least about 0.030 inches, a hole depth of at least about 0.4 inches and a depth/diameter ratio of at least about 10:1, comprising:

percussion laser drilling a central hole through the component to a diameter less than the predetermined diameter; then trepanning laser drilling around the central hole to expand the diameter of said hole to the predetermined diameter, and then repeating the above percussion laser drilling and trepanning laser drilling steps to drill said hole.

2. Process of claim 1 wherein the central hole has a diameter of up to about 0.020 inches.

3. Process of claim 2 wherein said hole has a depth/diameter ratio of about 20 to 30:1.

4. Process of claim 3 wherein the predetermined diameter is about 0.30 to 0.10 inches.

5. Process of claim 3 wherein the depth of the hole is about 0.4 to 1.5 inches.

6. Process of claim 1 wherein no barrier material is used abutting a rear exit of the hole.

7. Process of claim 6 wherein a protective barrier material is used on a wall of the component opposing the rear exit of the hole.

8. Process of claim 4 wherein said hole is a cooling hole.

9. Process of claim 6 wherein the component is of a gas turbine component.

10. Process of claim 1 wherein the percussion laser drilling and the trepanning laser drilling are carried out using a computer numerical control.

11. Process of claim 10 wherein the percussion drilling is carried out at 4 to 8 pulses/second and the trepanning is carried out at 10 to 15 pulses/second.

* * * * *